United States Patent [19]

Nakatsuma

[11] Patent Number: 5,134,502
[45] Date of Patent: Jul. 28, 1992

[54] DATA COMMUNICATION METHOD AND APPARATUS

[75] Inventor: Takuji Nakatsuma, Yokohama, Japan
[73] Assignee: Canon Kabushiki Kaisha, Tokyo, Japan
[21] Appl. No.: 701,026
[22] Filed: May 16, 1991
[30] Foreign Application Priority Data May 18, 1990 [JP] Japan .................................. 2-128812

[51] Int. Cl.$^5$ .............................................. H04N 1/32
[52] U.S. Cl. ..................................... 358/440; 358/434
[58] Field of Search ..................... 358/440, 434–436, 358/438; 375/38; 340/825, 825.01, 825.06

[56] References Cited

U.S. PATENT DOCUMENTS

| | | | |
|---|---|---|---|
| 4,847,694 | 7/1989 | Nishihara | 358/434 |
| 4,894,843 | 1/1990 | Yoshida et al. | 375/8 |
| 5,041,917 | 8/1991 | Kashiishi | 358/434 |
| 5,077,789 | 12/1991 | Masatomo | 358/440 |

Primary Examiner—Stephen Brinich
Attorney, Agent, or Firm—Fitzpatrick, Cella, Harper & Scinto

[57] ABSTRACT

A data communication apparatus connectable to a line having a plurality of communication channels or to a plurality of lines comprises: multi-address transmission means for transmitting document sheet information to a plurality of destinations through the plurality of communication channels or the plurality of lines. The multi-address transmission means starts the multi-address transmission to a second destination through one of the communication channels or the lines a predetermined time after the start of the multi-address transmission to a first destination through other one of the communication channels or the lines.

7 Claims, 5 Drawing Sheets

0
DATA COMMUNICATION METHOD AND APPARATUS

BACKGROUND OF THE INVENTION

1. Field of the Invention

The present invention relates to a data communication apparatus such as a facsimile device, and more particularly to a data communication apparatus which accommodate a plurality of channels or communication lines and effects multi-address transmission to a plurality of destinations by using those channels or communication lines in parallel.

2. Related Background Art

An ISDN (integrated service digital network) has been known as a line having a plurality of channels. A basic interface of a user network of the ISDN line is that one line comprises two information channels (B channels) and one control channel (D channel). A facsimile terminal uses the two B channels of the three communication channels to effect the multi-address transmission to two destinations.

In the prior art, however, since the two information channels are simultaneously used, there is no vacant channel during the multi-address transmission and other communication operations such as reception and prioritized transmission are not accepted.

SUMMARY OF THE INVENTION

The present invention eliminates the drawbacks of the prior art and it is an object of the present invention to provide a data communication method and apparatus which permit efficient communication other than the multi-address transmission during the multi-address transmission.

It is another object of the present invention to provide a data communication method and apparatus which can significantly increase the time during which any one of channels is vacant when the communication is effected through a plurality of channels.

In order to achieve the above objects, in accordance with the present invention, a predetermined time after a first multi-address transmission has been started through one channel or line, a second multi-address transmission is started through another channel or line so that one channel is kept vacant during the multi-address transmission to permit other communication operations such as reception and prioritized transmission through the vacant channel or line during the multi-address transmission.

The above and other objects of the present invention will be apparent from the following detailed description made with reference to the accompanying drawings.

DETAILED DESCRIPTION OF THE PREFERRED EMBODIMENTS

One embodiment of the present invention is now explained in detail with reference to the drawings. In the following embodiment, a digital facsimile device connected to an ISDN is explained.

Figure 1:
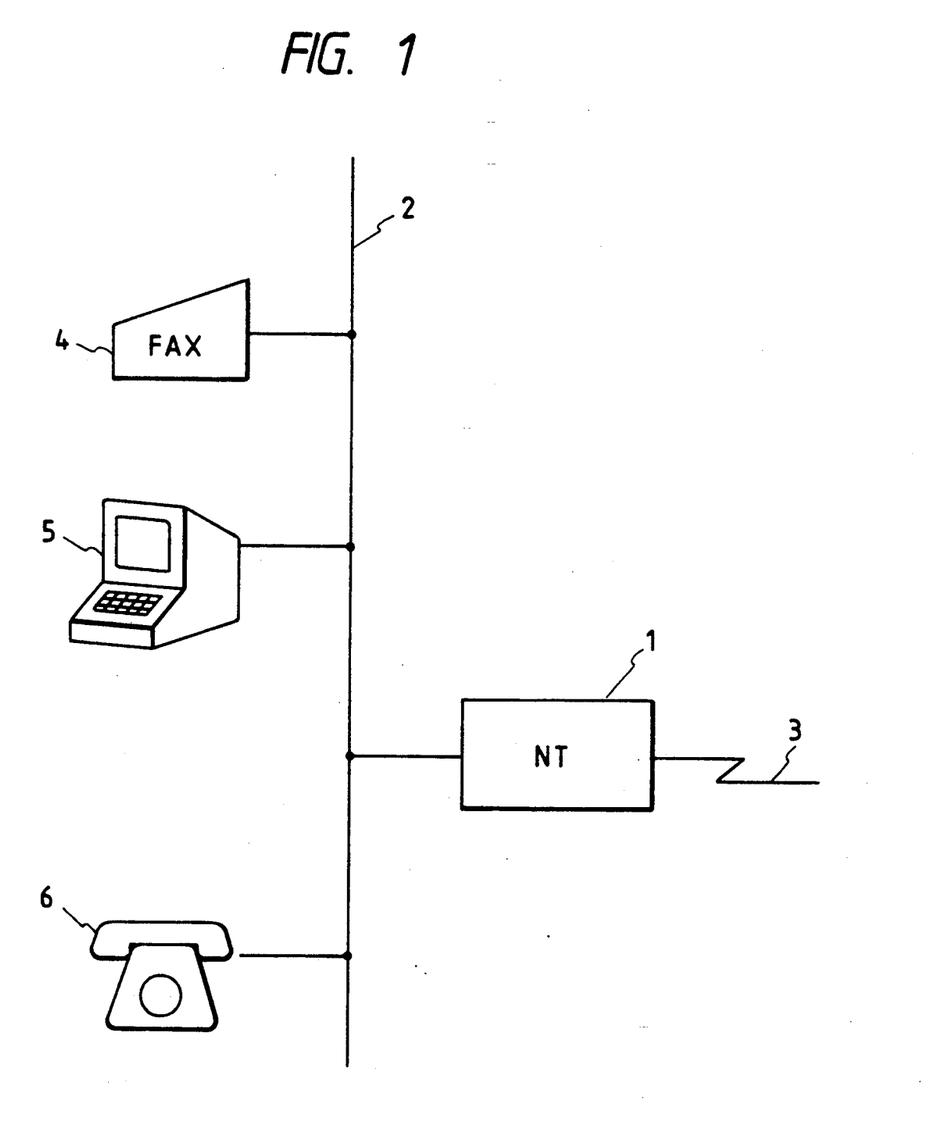
FIG. 1 shows a system diagram in which a facsimile device of one embodiment of the present invention is connected to an ISDN network.
Figure 2:
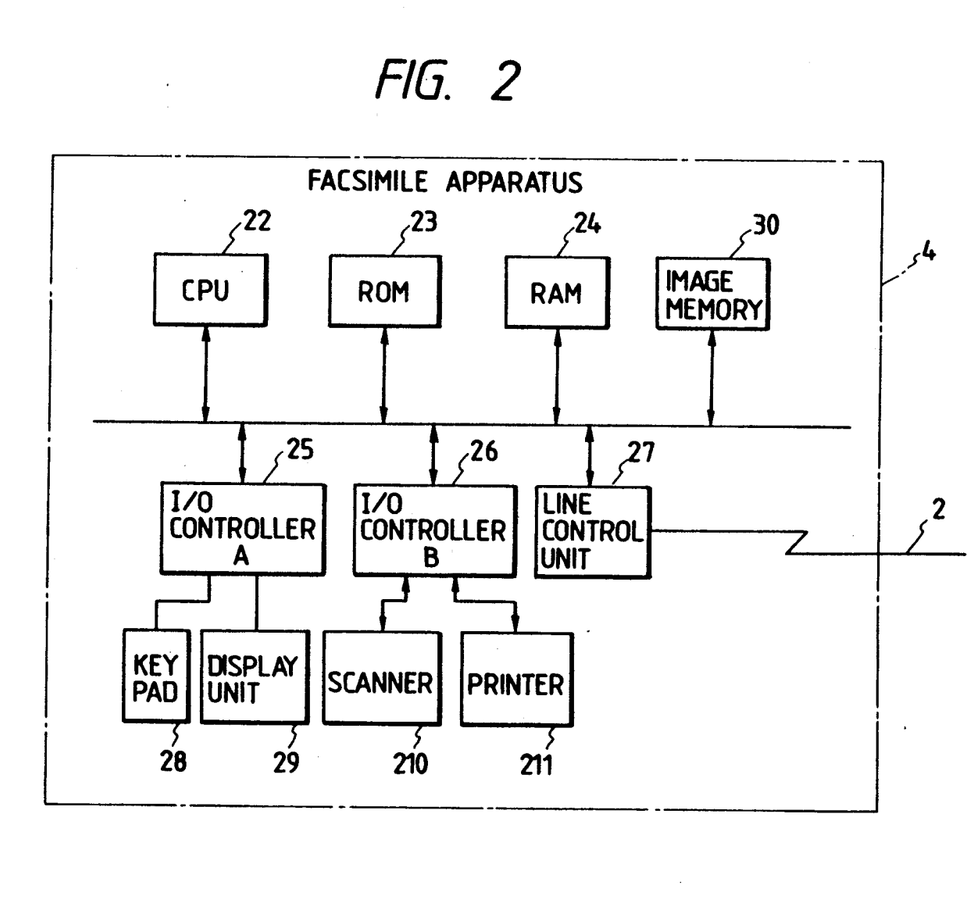
FIG. 2 shows a block diagram of the facsimile device of the embodiment.

FIG. 1 shows an ISDN system configuration to which the digital facsimile device of the embodiment of the present invention is connected. In FIG. 1, numeral 1 denotes a network terminator (NT), numeral 2 denotes a bus line which connects the network terminator 1 to a plurality of terminals (4 to 6), numeral 4 denotes the digital facsimile device of the present embodiment, numeral 5 denotes a telex device and numeral 6 denotes a digital telephone set. A detailed configuration of the digital facsimile device in the above system is shown in FIG. 2. Numeral 22 denotes a central processing unit which controls the entire device in accordance with a program shown in FIG. 4 which is stored in a ROM 23, numeral 24 denotes a RAM which stores transmission/received data, numeral 25 denotes an I/O controller A which controls a key pad 28 and a display 29, numeral 26 denotes an I/O controller B which controls a scanner 210 and a printer 211, numeral 27 denotes a line control unit, numeral 28 denotes a key pad for entering various operation commands to the device, numeral 29 denotes a display, numeral 210 denotes a scanner for reading a document sheet to be transmitted, numeral 211 denotes a printer for printing out received data, and numeral 30 denotes an image memory which stores multi-address transmission document sheet information read by the scanner 210. The information stored in the image memory is commonly transmitted to a plurality of designated destinations. The multi-address information is entered by the key pad 28 and stored in the RAM 24. The CPU 22 sequentially reads the address information stored in the RAM 24 and sends the information stored in the image memory 30.

Figure 3A:
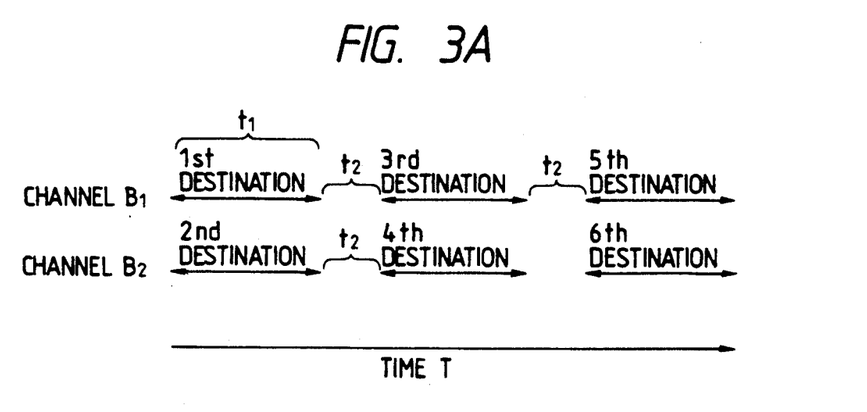
FIGS. 3A, 3B, 5 and 6 show time charts for explaining operations of multi-address transmission of the facsimile device.
Figure 3B:
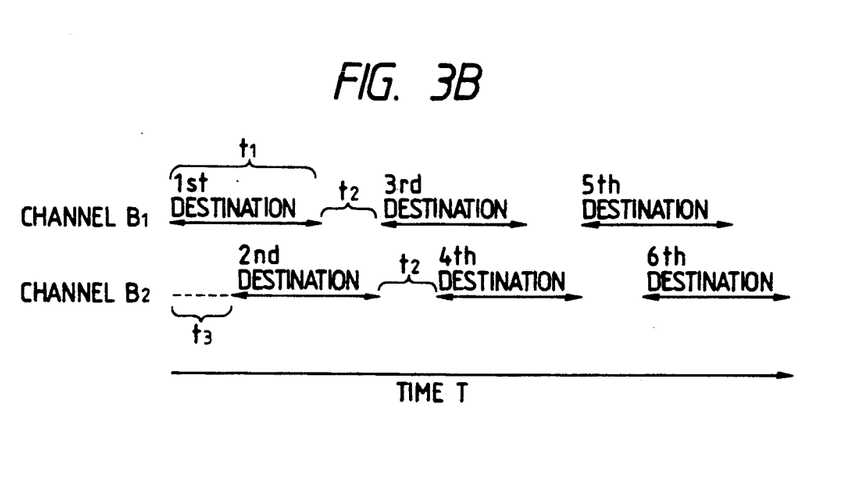

FIGS. 3A and 3B show time charts of channel occupancy times in the multi-address transmission. FIG. 3A shows that of prior art and FIG. 3B shows that of the present embodiment.

In FIGS. 3A and 3B, a time T represents a total time from the start of the multi-address transmission to the completion of the transmission to all destinations, t1 represents a communication time from the start of transmission to one destination to the completion thereof, t2 represents an interval time from the completion of one communication to the start of the next communication, and t3 represents a waiting time from the start of the multi-address transmission to the start of transmission to a record destination through a channel B2.

Figure 4:
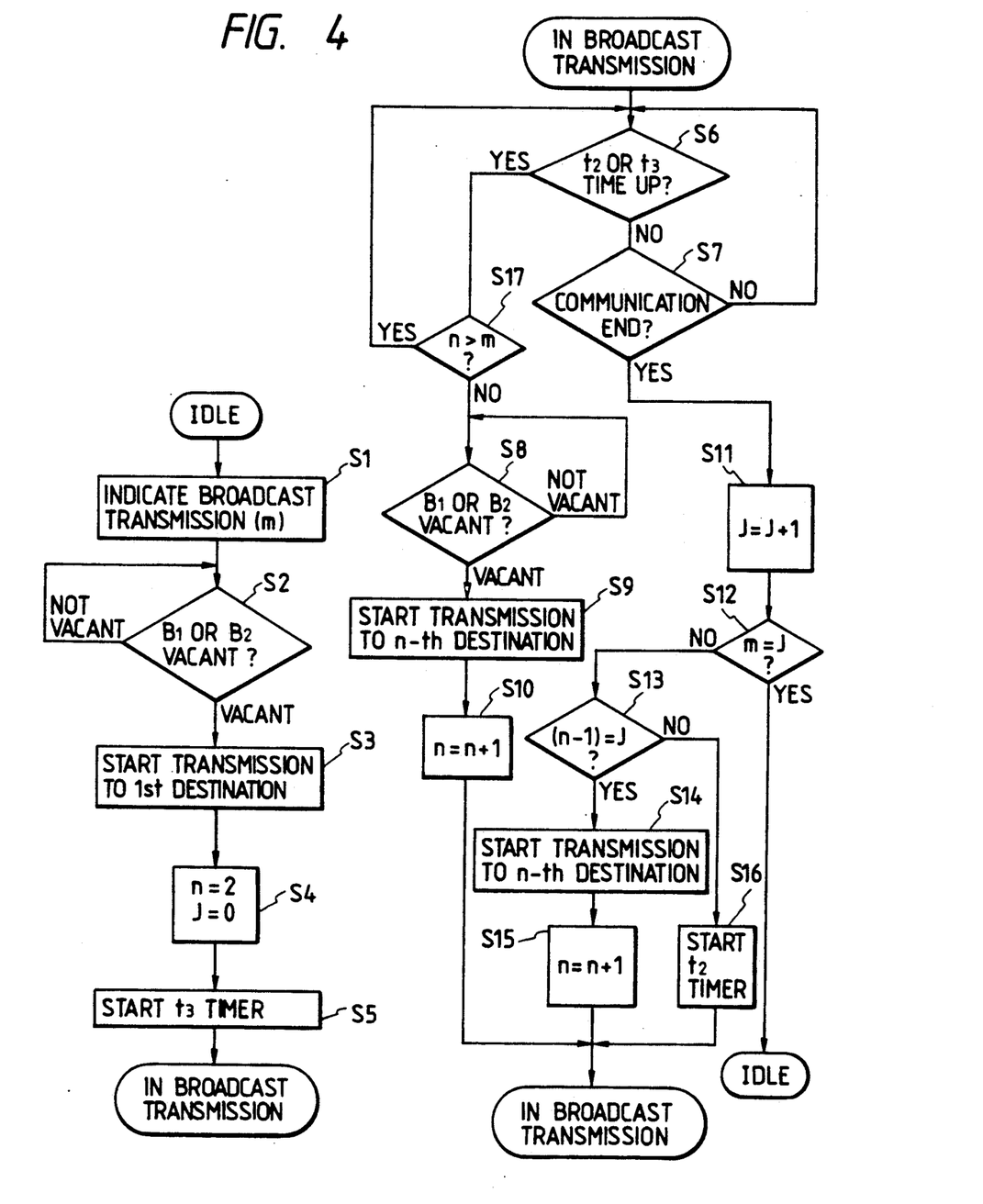
FIG. 4 shows a flow chart for explaining operations of FIGS. 1 to 3.
Figure 5:
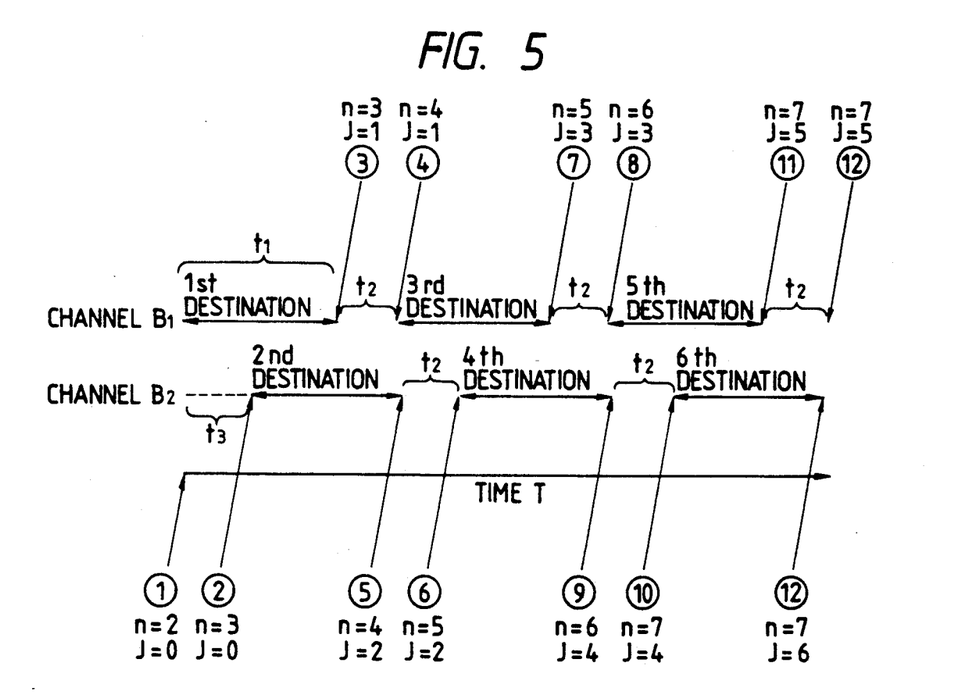

FIG. 4 shows a flow chart of a procedure of the multi-address transmission of the digital facsimile device of the present embodiment. FIG. 5 shows a chart similar to that shown in FIG. 3B with the addition of a number of destinations variable n and a number of completed communications variable J. The operation of the present invention is now explained with reference to FIGS. 3, 4 and 5.

In the present embodiment, it is assumed that the line used is the ISDN line having a basic interface comprising one D channel and two B channels, B1 and B2.

When the multi-address transmission is to be effected in the digital facsimile device, an operator first commands the multi-address communication from the key pad 28 in a step S1. In the present embodiment, it is assumed that a G4 facsimile device is used for 6-address transmission. (The number of destinations 6 is substituted for a variable m).

In a step S2, the current use of the B channels is checked to determine if there is a vacant B channel. If both B channels are busy, the step 2 is repeated to wait for the vacant state of the B channel. If the B channel is vacant, the transmission to a first destination is started in a step S3. (In the present example, both B channels are vacant and the B1 channel is used.) In a step S4, the next transmission destination number (n) is set to "2" and the number of completed communications (J) is set to "0" (Timing ① in FIG. 5). In a step S5, the waiting time t3 of FIG. 3 is set and the multi-address transmission in progress state is started to monitor the time-out of t2 and t3 and the completion of communication.

If the time t3 set in the step S5 is timed out while the multi-address transmission (broadcast transmission) is still in progress, the process proceeds from a step S6 to a step S8 through a step S7 to examine the use status of the B channels. If both B channels are busy, the step S8 is repeated to watch if the B channel becomes vacant. In the present example, the B1 channel is used for the first destination in the step S3 and the B2 channel is vacant. In a step S9, the transmission to the next transmission destination number n (2 in the present example) is started. In the step S8, the next transmission destination number n is incremented by one and the multi-address transmission still in progress is started (Timing ② in FIG. 5. n=3, J=0).

If the communication to the first destination is completed while the multi-address transmission is still in progress, the process proceeds from the step S7 to a step S11. In the step S11, the number of completed communications J is incremented by one (Timing ③ in FIG. 5. n=3, J=1). In a step S12, the number of destinations m and the number of completed communications J are compared. In the present example, the number of destinations m is 6, and the number of completed communications J is 1. Thus, the process proceeds to a step S13 to compare the next transmission destination number n minus one (n−1) and the number of completed communications J. If n−1=J, it means that no B channel is being used for the multi-address transmission, and if n−1 is not equal to J, it means that a B channel is being used for the multi-address transmission.

If (n−1)=J is met indicating that no B channel is being used for the multi-address transmission, the transmission to the n-th destination is started in a step S14, the next transmission destination number is incremented in a step S15, and the multi-address transmission in progress state is started. In the present example, n=3 and J=1. Thus, (n−1)=J is not met in the step S13 and the process proceeds to a step S16. In the step S16, the interval time t2 is set and the multi-address transmission in progress is started. If the time t2 set while the step S16 is timed out in the multi-address transmission is in progress (Timing ④ in FIG. 5), the process returns to the step S8, the transmission to the n-th destination is started in the step S9, the next transmission destination number n is incremented by one in the step S10, and the multi-address transmission in progress is started (Timing ④ in FIG. 5 n=4, J=1).

At the timing ⑤ in FIG. 5, the communication to the second destination is completed. In the step S11, J is incremented and the process proceeds to the steps S12 and S13. Since n=4 and J=1, the process proceeds to the step S16 to start the timer t2. At the timing ⑥ of FIG. 5, the time t2 is timed out and the process proceeds to the steps S8 to S10. Thus, n is incremented by one and now n=5 and J=2.

At the timing ⑦ of FIG. 5, the communication to the third destination is completed. Thus, J is incremented in the step S11, and the process proceeds to the steps S12 and S10. Since n=5 and J=3, the process proceeds to the step S16 to start the timer t2. At the timing ⑧ of FIG. 5, the time t2 is timed out and the process proceeds to the steps S8 to S10. As a result, n is incremented by one and now n=6 and J=3. At the timing ⑨ of FIG. 5, the communication to the fourth destination is completed. Thus, J is incremented in the step S11 and the process proceeds to the steps S12 and S13. Since n=6 and J=4, the process proceeds to the step S16 to start the timer t2. At the timing ⑩ of FIG. 5, the time t2 is timed out and the process proceeds to the steps S8 to S10. As a result, n is incremented by one and now n=7 and J=4. At the timing ⑪ of FIG. 5, the communication to the fifth destination is completed. Thus, J is incremented in the step S11 and the process proceeds to the steps S12 and S10. Since n=7 and J=5, the process proceeds to the step S16 to start the timer t2. When the timer started at the timing ⑪ of FIG. 5 is timed out, the process proceeds from the step S16 to the step S17 (Timing ⑫ of FIG. 5). In the previous time-out, n is smaller than m (=6) and the process proceeds to the step S8. In the step S17, n is now 7 and larger than m. Thus, the process does not proceed to the step S8. At the timing ⑫ of FIG. 5, the communication to the sixth destination completed and J is incremented in the step S11. As a result, J is now 6 and the condition of m=J in the step S12 is met. Thus, the process proceeds from the step S12 to an idling state.

In this manner, the multi-address transmission to the m destinations set in the step S1 is completed.

When the multi-address transmission is effected in the procedure described above, the interval time t2 in the channel B1 does not overlap with the interval time in the channel B2 as shown in FIG. 3, and the time in which either one of the channels B1 and B2 is vacant is double of the interval time t2.

Accordingly, the interval time can be longer than that of the prior art and the communications other than the multi-address transmission can be readily accepted during the multi-address transmission through the plurality of channels.

Figure 6:
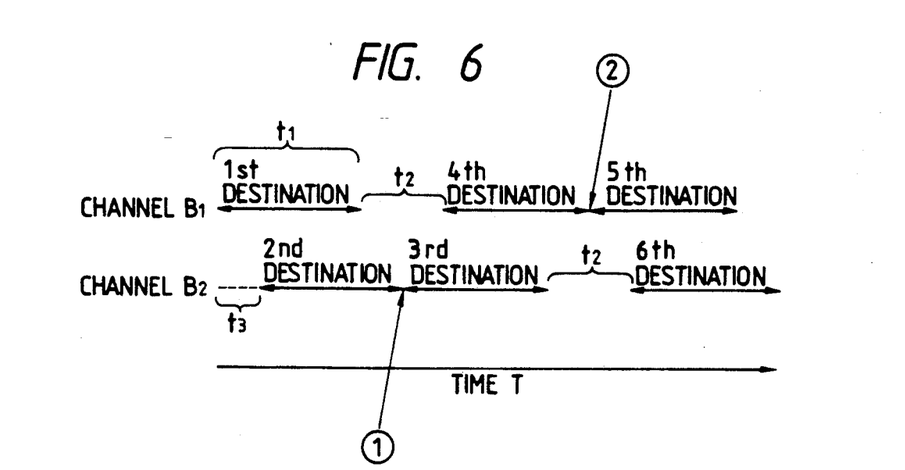

When the communication to one destination is completed in the multi-address transmission of FIGS. 3 and 5, the process proceeds from the step S10 to the step S14 of the flow chart of FIG. 4 to start the timer t2. In an embodiment shown in FIG. 6, at the timing ① when the communication to the second or fourth destination is completed, the transmission to the third or fifth destination is immediately effected. In the step S13 of the flow chart of FIG. 4, the condition of (n−1)=J is met and the process proceeds to the step S14. In the embodiment of FIG. 6, if both channels B1 and B2 are vacant when the communication to one destination is completed, the transmission to the next destination is immediately started without starting the timer so that the effective utilization of the line is attained. The communication time T is shorter than that in the prior art multi-address transmission shown in FIG. 3A and the vacant time for at least one line is longer by the time t3 shown in FIG. 6. The overall transmission time in FIG. 6 is shorter than that in FIG. 3B. The multi-address transmission of the type shown in FIG. 3B or that shown in FIG. 6 can be selected by the settings of the waiting time t3 and the interval time t2. The settings may be entered in the step S1 of FIG. 4.

As described above, in the multi-address transmission of the facsimile device, the function to call the second destination after the waiting time from the start of the multi-address transmission to the first destination is provided so that the overlap of the interval times of the channels B1 and B2 during the multi-address transmission is eliminated. Further, the time in which either the channel B1 or B2 is vacant during the multi-address transmission is significantly increased, and the waiting time of other operation such as reception or prioritized transmission during the multi-address transmission is reduced, and the operability is improved.

While the preferred embodiments of the present invention have been explained, the present invention is not limited to those embodiments and various modifications thereof may be made without departing from the claims.

I claim:

1. A data communication apparatus connectable to a line having a plurality of communication channels or to a plurality of lines, comprising:

multi-address transmission means for transmitting document sheet information to a plurality of destinations through said plurality of communication channels or said plurality of lines;

said multi-address transmission means starting the multi-address transmission to a second destination through one of said communication channels or said lines a predetermined time after the start of the multi-address transmission to a first destination through another one of said communication channels or said lines.

2. A data communication apparatus according to claim 1 wherein said multi-address transmission means further starts the multi-address transmission to a third destination a predetermined time after the completion of the transmission to the first destination.

3. A data communication apparatus according to claim 1 further comprising:

read means for reading a document sheet image to generate document sheet information; and an image memory for storing the document sheet information;

said multi-address transmission means transmitting the data stored in said image memory to the plurality of destinations.

4. A communication method in a data communication apparatus connected to a line having first and second channels, comprising;

a first transmission step for transmitting data to a first destination through the first channel;

a first timer step for starting a first timer in response to the start of transmission of the data in said first transmission step;

a decision step for determining whether a first predetermined time is counted in said first timer step; and a second transmission step for transmitting data to a second destination through the second channel when the time-out of the first predetermined time is detected in said decision step.

5. A communication method according to claim further comprising:

a second timer step for starting a second timer after the completion of the transmission of the data is said first transmission step; and a third transmission step for transmitting data to a third destination through the first channel when the time-out of a second predetermined time is detected in said second timer step.

6. A communication method according to claim 5 wherein the data transmitted in said first, second and third transmission steps are the same data, and said apparatus has a memory for storing the data.

7. A communication method according to claim 5 wherein said third transmission step immediately transmits the data to the third destination through the first channel when the second channel is vacant at the completion of the transmission of the data in said first transmission step.

* * * * *

UNITED STATES PATENT AND TRADEMARK OFFICE
CERTIFICATE OF CORRECTION

PATENT NO. : 5,134,502
DATED : July 28, 1992
INVENTOR(S) : TAKUJI NAKATSUMA

It is certified that error appears in the above-identified patent and that said Letters Patent is hereby corrected as shown below:

COLUMN 3

Line 52, "state" should be deleted.
Line 56, "while" should read --in--.
Line 57, "in the" should read --while the--.

COLUMN 4

Line 23, "S10." should read --S13.--.
Line 51, "step S10" should read --step S13--.

COLUMN 5

Line 28, "document sheet information" should read --original information--.
Line 31, "said" should read --wherein said-- and "starting" should read --starts--.

UNITED STATES PATENT AND TRADEMARK OFFICE
CERTIFICATE OF CORRECTION

PATENT NO. : 5,134,502
DATED : July 28, 1992
INVENTOR(S) : TAKUJI NAKATSUMA

It is certified that error appears in the above-identified patent and that said Letters Patent is hereby corrected as shown below:

<u>COLUMN 6</u>

Line 12, "comprising;" should read --comprising:--.
Line 24, "claim fur-" should read --claim 4, fur- --.
Line 27, "is" should read --in--.

Signed and Sealed this

Twenty-third Day of November, 1993

Attest:

BRUCE LEHMAN

*Attesting Officer*    Commissioner of Patents and Trademarks